United States Patent
Spettl

(10) Patent No.: US 6,758,321 B2
(45) Date of Patent: Jul. 6, 2004

(54) CHAIN STORE AND PROCESS FOR LOADING THE STORE

(75) Inventor: Jörg Spettl, Lörrach (DE)

(73) Assignee: Rotzinger Aktiengesellschaft, Kaiseraugst (CH)

( * ) Notice: Subject to any disclaimer, the term of this patent is extended or adjusted under 35 U.S.C. 154(b) by 106 days.

(21) Appl. No.: 10/243,249

(22) Filed: Sep. 12, 2002

(65) Prior Publication Data

US 2003/0234601 A1 Dec. 25, 2003

(30) Foreign Application Priority Data

Jun. 25, 2002 (EP) .......................................... 02405531

(51) Int. Cl.[7] .................................................. B65G 1/00
(52) U.S. Cl. .................................... 198/347.1; 198/812
(58) Field of Search ............................ 198/347.1, 588, 198/812

(56) References Cited

U.S. PATENT DOCUMENTS

| | | | | |
|---|---|---|---|---|
| 2,932,376 A | * | 4/1960 | Millington | .................. 198/812 |
| 3,053,378 A | * | 9/1962 | Longenecker | ................ 198/812 |
| 5,322,154 A | * | 6/1994 | Lenherr | ....................... 198/812 |
| 5,960,927 A | * | 10/1999 | Bahr | ........................ 198/347.1 |
| 6,591,963 B2 | * | 7/2003 | Wipf | ........................ 198/347.2 |

* cited by examiner

Primary Examiner—James R. Bidwell
(74) Attorney, Agent, or Firm—Sidley Austin Brown & Wood, LLP

(57) ABSTRACT

Chain stores are provided for buffering and/or short-term storage of articles. They have a plurality of gondolas which are suspended from two chains which in turn run vertically over a plurality of deflection pulleys. Because of the requirement for realizing constantly higher capacities and for increasing the loading and unloading frequency of the store, the gondolas rock to an increasing extent at the deflection pulleys. At a sufficiently high cycle frequency during loading and/or unloading, this can lead to rocking of the gondolas over the total length of the chain, which can result in the articles being thrown out of the gondolas. The chain store according to the invention is now characterized in that a drive device is provided for separating the movement of the chain during loading into a chain movement which has a high frequency in the region of the loading side and an adjacent continuous or low-frequency chain movement.

6 Claims, 1 Drawing Sheet

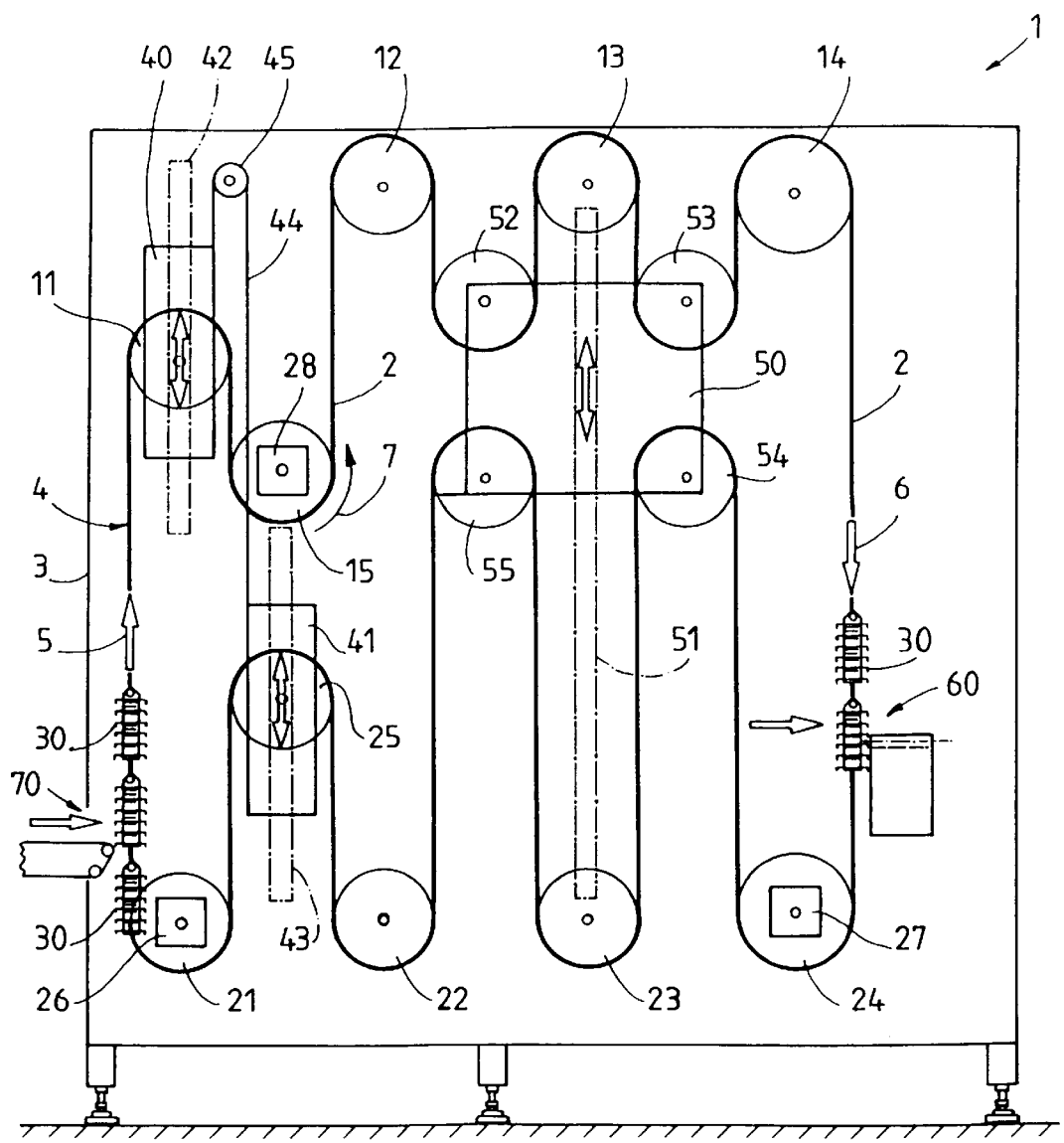

CHAIN STORE AND PROCESS FOR LOADING THE STORE

BACKGROUND OF THE INVENTION

1. Field of the Invention

The invention relates to a chain store and a process for loading the chain store.

The chain store and the process can be used for the temporary storage of articles or products of the same type.

The articles or products may be, for example, chocolate bars which are transported from a production apparatus to at least one packaging apparatus. However, the products may consist not of chocolate bars but of other sweet or nonsweet food in the form of pieces, for example bakery articles, or of cans or other containers having any filling or of components for mechanical engineering, for example ball bearings, which are transported to a packaging apparatus or other processing apparatuses.

2. Description of the Prior Art

In the case of known means for the production and packaging of chocolate bars, the bars produced by a production apparatus are transported via a feed belt to a chain store and then through this to packaging apparatuses. The chain store serves in this case as a compensating apparatus for compensating variations in the feed rate of bars or the packing rate of the packaging apparatus and complete stoppages of operation of the production apparatus or of the packaging apparatus, for example lasting for 5 min to 45 min. A chain store of this type typically has 150 to about 1200 gondolas attached to two continuous chains and having a plurality of shelves for holding one row of bars each. Each chain is deflected by a plurality of chain wheels mounted in a frame and by a plurality of chain wheels mounted on vertically displaceable carriages and forms a number of loops.

In the case of the known chain stores, those chains for the loading and unloading side which are each driven by a drive motor are intermittently moved, i.e. they are stationary while products are being loaded onto the shelves at the loading station and are being unloaded again on the shelves at the unloading station. The store operates according to the "first-in"/"first-out" principle and makes it possible to operate infeed and outflow at different speeds.

Thus, one storage level after the other is loaded for filling the chain store, for which purpose a loading motor controlled by a control mechanism moves the loading side stepwise past the loading station, while the unloading side controllable by an unloading motor is blocked. For removal of articles from the store, the unloading side is moved stepwise past the unloading station so that the storage levels can likewise be unloaded stepwise.

Because of the requirement for realizing constantly higher capacities and for increasing in particular the loading frequency of the store, the gondolas rock to an increasing extent at the deflection pulleys. This can lead to rocking of the gondolas over the total length of the chain at a sufficiently high cycle frequency or transport velocity, which in the extreme case results in the goods being thrown out of the gondolas.

This disadvantage has long been known to a person skilled in the art. Thus, for example, U.S. Pat. No. 4,813,752 discloses an antioscillation system which, by rolling of gear wheels in the manner of a planetary gear, ensures that the gondolas are guided perpendicularly and rigidly in the region of the deflection pulleys, in order thus to avoid disadvantageous rocking movements. Said system comprises gear wheels which are arranged on the deflection pulleys and the gondolas and engage one another with their teeth during the deflection.

This antioscillation system has the disadvantage that the gondolas are guided at the deflection pulleys so rigidly that the goods present on the storage level may be thrown off owing to the centrifugal force acting only on them in this case—and no longer on the gondolas—and produced by the deflection, if the velocity at which the gondolas are guided around the deflection pulleys exceeds a limit dependent on the mass of the goods.

SUMMARY OF THE INVENTION

It is the object of the invention to propose a chain store by means of which the above-mentioned disadvantage can be at least partly avoided, so that in particular the loading frequency can be increased compared with the conventional chain store.

This object is achieved, according to the invention, by a chain store comprising two continuous chains which together carry gondolas serving for holding goods and are driven together by gear wheels or chain wheels rigidly connected to one another, each chain being guided by means of upper and lower stationary deflection pulleys, on the one hand a loading station and on the other hand an unloading station being provided on the two outermost sides of the chain, and one drive device each being coordinated with the loading and unloading side, which device in each case drives the lower or upper stationary outermost deflection pulley coordinated with the loading or unloading side, wherein each chain is guided in the region of the loading station around two stationary deflection pulleys and over two deflection pulleys, each of which is mounted freely rotatably in a vertically displaceable carriage, in such a way that the chain passes in each case from the outermost, upper or lower deflection pulley mounted freely rotatably in the first carriage downwards or upwards, respectively, to a further stationary deflection pulley and from there perpendicularly upwards or downwards, respectively, to the next upper or lower deflection pulley mounted in a stationary manner, that it passes in each case from the second outermost lower or upper stationary deflection pulley perpendicularly upwards or downwards, respectively, to the deflection pulley of the second carriage and from there perpendicularly downwards or upwards, respectively, to the lower or upper outermost deflection pulley mounted in a stationary manner, the two carriages are arranged one on top of the other in a staggered manner and are additionally connected to one another by means of at least one chain, one belt or one tackle, which chain, belt or tackle is guided around an upper deflection pulley mounted in a stationary manner, and a drive device is provided for separating the movement of the chain during loading into a chain movement which has a high frequency in the region of the loading side and an adjacent continuous or low-frequency chain movement.

A further object of the invention is a process for controlling a chain store as mentioned above, wherein the drive device has a compensating motor which drives the chain or uncouples from it in such a way that the movement of the chain during the loading is separated into a high-frequency chain movement in the region of the loading side and into a continuous or low-frequency chain movement in the remaining chain region, so that disadvantageous rocking of the gondolas during the high-frequency loading process over the total length of the chain is thus prevented.

DESCRIPTION OF THE PREFERRED EMBODIMENT

An embodiment of the invention is described below with reference to the only FIGURE of the drawing.

The chain store shown in the FIGURE and denoted as a whole by 1 has four upper and four lower pairs of deflection pulleys over which a chain pair formed from two continuous chains 2 is guided. In the drawing, only one chain 2 of the chain pair and only one pulley of each pair of pulleys are visible, so that only one chain 2 or one pulley is generally referred to below. The upper pulleys are denoted by 11 to 14 and the lower pulleys by 21 to 24. Of these pulleys, the two deflection pulleys 21 and 24 are each driven by a motor 26 or 27, respectively, and, with the exception of the outermost upper chain wheel 11 shown on the left in the drawing, all upper and lower pairs of deflection pulleys are mounted in a stationary manner in a frame 3.

The individual gondolas serving for holding the articles or product rows are denoted by 30. These gondolas 30 indicated only schematically in the figure may have, for example, a plurality of storage levels. The gondolas 30 are moreover fastened by suspension at two ends from the two chains 2 in such a way that the storage levels always retain their horizontal position regardless of the position of the chains 2.

During operation of the chain store 1, the loading side 4 as shown on the left in the FIGURE is driven in such a way that the chains 2 move upwards from the bottom and the store 1 is loaded in the direction of the arrow 5.

According to the invention, the chain store 1 is formed in such a way that it permits a loading capacity of over 100, for example 120 to 150, shelves per minute without disadvantageous rocking of the gondolas 30 being caused in the rear region of the store 1 by the cyclic loading.

In order to achieve such a high loading capacity, the loading side 4 shown on the left in the FIGURE is designed as follows:

Each chain 2 is guided in the region of the loading side 4 around two stationary deflection pulleys 15 and 21 and over two deflection pulleys 11 and 25, each of which is mounted freely rotatably in a vertically displaceable carriage 40 or 41, in such a way that the chain 2 passes in each case from the outermost, upper deflection pulley 11 mounted freely rotatably in the first carriage 40 perpendicularly downwards to the stationary deflection pulley 15 and from there perpendicularly upward to the subsequent upper deflection pulley 12 mounted stationary in the frame 3, that it passes in each case from the lower stationary deflection pulley 22 which is the penultimate one in the direction of movement upwards to the deflection pulley 25 of the second carriage 41 and from there perpendicularly downward to the lower outermost deflection pulley 21 mounted stationary in the frame 3.

The two carriages 40 and 41 are vertically displaceable over about half the maximum length of the loading side 4 in one rail 42 or 43 each and are additionally connected to one another by at least one chain 44 which is guided around an upper deflection pulley 45 mounted stationary in the frame 3.

Furthermore, the likewise stationary deflection pulley 15 arranged between the vertically displaceable, upper deflection pulley 11 and the deflection pulley 12 is provided with a compensating motor 28 in order, on the one hand, to separate the movement of the chain 2 during loading into a chain movement which has a high frequency in the region of the loading side 4 and a chain movement which is continuous or has a low frequency in the remaining region.

Four further deflection pulleys or deflection rollers are also present between the pairs of pulleys 12, 13 and 14 or 22, 23 and 24 which are mounted freely rotatably in fixed bearings. Said pulleys or rollers are mounted freely rotatably in a vertically displaceable, third carriage 50, the carriage 50 being guided in a vertical rail 51 and here too the invisible opposite side of the carriage 50 being identically formed.

The course of the chain 2 in the region of this third carriage 50 is clearly shown in FIG. 1. From the upper deflection pulley 12, it leads perpendicularly downwards to the upper deflection pulley 52 of the carriage 50, from there perpendicularly upward to the stationary deflection pulley 13, from there once again perpendicularly downwards to the upper deflection pulley 53 of the carriage 50 and from there once again upwards to the stationary deflection pulley 14. From there, the chain then leads past the unloading station 60 to the deflection pulley 24 and from there over the lower deflection pulleys 54 and 55 of the carriage 50 and over the stationary lower deflection pulleys 23, 22 and 21 back to the loading station 70.

For filling the store 1, one storage level after the other is loaded at the loading station 70, for which purpose the motor 26 controlled by a control mechanism rotates the pulley 21 stepwise in the direction of the arrow 5 while the unloading motor 27 keeps the pulley 24 blocked. As soon as a gondola 30 has been completely loaded, a so-called gondola jump occurs, i.e. the loading side 4 is moved upward by the distance between two gondolas 30 and the uppermost storage level of the next gondola 30 is brought into the loading position.

On removal of the article from the store 1, the motor 27 of the pulley 24 is put into operation in an analogous manner so that it pulls that side of the chain 2 which passes the unloading station stepwise downward in the direction of the arrow 6 until in each case a gondola 30 arrives at the unloading station 60. The gondolas 30 can then be unloaded in succession, in the manner already known in the case of the conventional chain stores.

In an embodiment of the process according to the invention for controlling the loading process, the compensating motor 28 of the stationary deflection pulley 15 serves for fixing that part of the chain 2 which is at the rear with respect to the loading side 4, during the stepwise loading of a gondola 30, so that disadvantageous rocking of the already loaded gondolas 30 during the high-frequency loading process is thus prevented over the total length of the chain 2.

In another embodiment of the process according to the invention, the compensating motor 28 serves for continuously driving that part of the chain 2 which is at the rear with respect to the loading side 4, during the stepwise loading of a gondola 30, i.e. for separating the chain movement in this case into a high-frequency chain movement of the loading side 4 which is dependent on the loading frequency and a continuous movement of the remaining part of the chain 2. Also as a result of this, the disadvantageous rocking and oscillation movement of already loaded gondolas 30 which is caused by the cycle frequency of the loading process is prevented.

The chain store 1 furthermore has control means which are not shown and which have, for example, manually operatable control elements, electronic elements, for example at least one digital processor, display and registration devices and data stores and possibly pneumatic and/or hydraulic control elements, such as valves and the like. Electrical cables and possibly fluid lines connect the control means to the loading station 70, the unloading station 60 and the motors 26 and 27 of the loading and unloading side and to the motor 28 of the stationary deflection pulley 15. The control means are moreover formed in such a way that the loading, temporary storage and unloading of the product can be alternatively controlled with the aid of the control elements by at least one person and/or at least from time to time automatically.

The operation of a chain store 1 integrated in the production plant will now be explained. The ideal operation taking place in the ideal case will first be described. During this operation, a production apparatus continuously produces articles and feeds them, for example row by row and at uniform time intervals, to the loading station 70 of the chain store 1.

If the chain store 1 is empty at the start of a production process, the two carriages 41 and 50 are in their uppermost vertical position and the carriage 40 is in its lowest vertical position, and, on arrival of the articles at the loading station 70, the chain store 1 is first filled at most partly, namely at most approximately half-filled. During the loading, the carriage 50 moves vertically downwards stepwise or continuously at each gondola jump—with deflection pulley 24 blocked.

By means of the two carriages 40 and 41 and the compensating motor 28 of the stationary deflection pulley 15, the disadvantageous rocking and oscillation movement of already loaded gondolas 30 can be prevented—as already mentioned.

In the first embodiment of the process according to the invention, the driving motor 28 blocks the deflection pulley 15 so that the carriage 40 is moved vertically upward and the carriage 41 coupled thereto is moved vertically downwards by the same height. That part of the chain 2 shown to the right of the deflection pulley 15 in the drawing remains stationary, with the result that the disadvantageous rocking and oscillation movement is prevented.

After all shelves of a gondola 30 have been filled and the two carriages 40 and 41 have reached their uppermost or lowermost position, the next gondola 30 is brought into the loading position for loading its first upper shelf. During this gondola jump, the blocking of the chain 2 at the deflection pulley 15 is eliminated and said pulley is additionally driven by means of the compensating motor 28 in the direction of the arrow 7 so that the two carriages 40 and 41 are moved downwards and upwards, respectively, so that they once again assume, respectively, their original lower or upper starting position required for loading a gondola 30, and the loading process described above can be repeated.

In this first embodiment of the process according to the invention for loading the chain store 1 with a loading frequency which is higher compared with conventional chain stores, the movement of the chain 2 in the region of the loading side 4 is divided into a high-frequency movement of the loading side 4 and a low-frequency movement of the chain strand adjacent to the loading side, which low-frequency movement is synchronized with the gondola jump.

In the second embodiment of the process according to the invention, the compensating motor 28 inevitably drives the deflection pulley 15 during the loading process so uniformly that that part of the chain which is uncoupled from the high-frequency loading side 4—at most with the exception of the blocked unloading side—is advanced continuously so that, in this case too, disadvantageous rocking of the gondolas 30 which is caused by the starting and stopping of the loading side 4, in the chain region moved independently of the loading side 4, is prevented.

After the store 1 has been at most half-filled, the unloading station 60 is also put into operation, i.e. the blocking of the unloading side is eliminated so that articles can be loaded continuously and without interruption onto the gondolas 30 at the loading station 70 and can be fed at a constant transport rate, which during ideal operation is equal to the production rate, via the unloading station 60 to a packaging apparatus. During this ideal operation, the control of the compensating motor 28 does not change substantially from the loading mechanism described above.

The ideal operation described above may be disturbed by various faults. For example, one of the product rows fed to the loading station 70 may be missing from time to time. It is also possible for the feed rate of the articles fed to the store 1 and the packing rate of the packaging apparatus to differ from one another temporarily. The production rate of the production apparatus may be temporarily slightly lower than during ideal operation, for example owing to some small fault, so that the feed rate of the transported article is lower than the packing rate of the packaging apparatus. It is also possible for the packaging apparatus to operate temporarily more slowly than intended. This may occur, for example, if the articles transported to the packaging apparatus lie slightly skew relative to the transport direction on the removal belt leaving the store 1 and then have to be aligned prior to packing.

In all these cases, the control means can control the chain store 1 in such a way that the articles on the removal belt have the spacings intended for ideal operation and reach the packaging apparatus at the time intervals intended in the case of ideal operation. During automatic operation, the control means effect an optional independent slowing down, acceleration or blocking of the loading or unloading process. Furthermore, the control means control the compensating motor 28 of the deflection pulley 15 in such a way that the two carriages 40 and 41 in one case are each moved to their starting position before the loading of a gondola 30 and, in the other case, as far as possible never reach their vertical position completely at the top or bottom during the loading of a gondola 30.

The chain store 1 according to the invention can be modified in various ways. Thus, a plurality of vertically displaceable carriages 50 arranged one behind the other, for example two or three thereof, may be provided for increasing the storage capacity. Furthermore, the two carriages 40 and 41 provided in the region of the loading side 4 may also be coupled to one another by means of a belt or tackle, and the pulleys 21 and 22 can be vertically exchanged with the pulleys 11 and 15, so that, correspondingly, the upper outermost deflection pulley on the loading side is provided with a drive motor, and the carriage 40 is arranged vertically displaceably in the lower half and the carriage 41 is arranged vertically displaceably in the upper half of the frame 3.

What is claimed is:

1. Chain store comprising two continuous chains which together carry gondolas serving for holding goods and are driven together by gear wheels or chain wheels rigidly connected to one another, each chain being guided by means of upper and lower stationary deflection pulleys, on the one hand a loading station and on the other hand an unloading station being provided on the two outermost sides of the chain, and one drive device each being coordinated with the loading and unloading side, which device in each case drives the lower or upper stationary outermost deflection pulley coordinated with the loading or unloading side, wherein each chain is guided in the region of the loading station around two stationary deflection pulleys and over two deflection pulleys, each of which is mounted freely rotatably in a vertically displaceable carriage, in such a way that the chain passes in each case from the outermost, upper or lower deflection pulley mounted freely rotatably in the first carriage downwards or upwards, respectively, to a further stationary deflection pulley and from there perpendicularly upwards or downwards, respectively, to the next upper or lower deflection pulley mounted in a stationary manner, that it passes in each case from the second outermost lower or upper stationary deflection pulley perpendicularly upwards or downwards, respectively, to the deflection pulley of the second carriage and from there perpendicularly downwards or upwards, respectively, to the lower or upper outermost deflection pulley mounted in a stationary manner, the two carriages are arranged one on top of the other in a staggered manner and are additionally connected to one another by means of at least one chain, one belt or one tackle, which chain, belt or tackle is guided around an upper deflection pulley mounted in a stationary manner, and a drive device is provided for separating the movement of the chain during loading into a chain movement which has a high frequency in the region of the loading side and an adjacent continuous or low-frequency chain movement.

2. Chain store according to claim 1, wherein the drive device has a compensating motor which can drive, block or release a stationary deflection pulley in order to separate the movement of the chain into the movement which has a high frequency in the region of the loading side and an adjacent continuous or low-frequency movement.

3. Chain store according to claim 1, wherein each chain being guided over at least three upper and three lower stationary deflection pulleys and over deflection pulleys, two each of which are mounted freely rotatably one on top of the other in a vertically displaceable further carriage, in such a way that the chain passes in each case from an upper stationary deflection pulley perpendicularly downwards to an upper deflection pulley of the carriage and from there perpendicularly upwards to the next stationary upper deflection pulley and that it passes in each case from a lower stationary deflection pulley perpendicularly upwards to the lower deflection pulley of the carriage and from there perpendicularly downwards to the next stationary lower deflection pulley.

4. Process for controlling a chain store according to claim 2, wherein the compensating motor drives the chain or uncouples from it in such a way that the movement of the chain during the loading is separated into a high-frequency chain movement in the region of the loading side and into a continuous or low-frequency chain movement in the remaining chain region, so that disadvantageous rocking of the gondolas during the high-frequency loading process over the total length of the chain is thus prevented.

5. Process according to claim 3, wherein the compensating motor fixes that part of the chain which is at the back with respect to the loading side, during the stepwise loading of a gondola, by blocking a stationary deflection pulley.

6. Process according to claim 3, wherein the compensating motor is inevitably driven during the loading process so uniformly that that part of the chain which is uncoupled from the high-frequency loading side is advanced continuously, at most with the exception of the blocked unloading side.

* * * * *